US009936097B2

(12) United States Patent
Taira

(10) Patent No.: US 9,936,097 B2
(45) Date of Patent: Apr. 3, 2018

(54) NON-TRANSITORY STORAGE MEDIUM STORING PRINTER DRIVER TO RESTRICT AVAILABLE FUNCTIONS DEPENDENT UPON COMMUNICATION SPEED WITH SERVER

(71) Applicant: KYOCERA Document Solutions Inc., Osaka (JP)

(72) Inventor: Yoshiyuki Taira, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/364,981

(22) Filed: Nov. 30, 2016

(65) Prior Publication Data

US 2017/0155795 A1 Jun. 1, 2017

(30) Foreign Application Priority Data

Nov. 30, 2015 (JP) .................. 2015-232780

(51) Int. Cl.
*H04N 1/00* (2006.01)
*H04N 1/333* (2006.01)
*H04L 29/06* (2006.01)

(52) U.S. Cl.
CPC ....... *H04N 1/33323* (2013.01); *H04N 1/0097* (2013.01); *H04N 1/00344* (2013.01); *H04N 1/00925* (2013.01); *H04N 1/00931* (2013.01); *H04N 1/00973* (2013.01); *H04N 1/33346* (2013.01); *H04L 67/42* (2013.01); *H04N 2201/0094* (2013.01); *H04N 2201/3335* (2013.01)

(58) Field of Classification Search
CPC ............ H04N 1/33323; H04N 1/00925; G06F 3/1225; G06F 3/1255; G06F 3/1276; G06F 3/1288
See application file for complete search history.

(56) References Cited

U.S. PATENT DOCUMENTS

| | | | |
|---|---|---|---|
| 2007/0061429 A1* | 3/2007 | Lin ...................... | G06F 9/5083 709/220 |
| 2014/0085676 A1* | 3/2014 | Kishimoto ......... | H04N 1/00233 358/1.15 |
| 2016/0248922 A1* | 8/2016 | Kurumasa .......... | H04N 1/00209 |

FOREIGN PATENT DOCUMENTS

JP 2010-256958 A 11/2010

* cited by examiner

*Primary Examiner* — Benjamin O Dulaney
(74) *Attorney, Agent, or Firm* — Hawaii Patent Services; Nathaniel K. Fedde; Kenton N. Fedde

(57) ABSTRACT

To provide a non-transitory storage medium and a client device, both having a printer driver (PD), that are capable of suppressing the performance degradation of the printer driver resulting from a time required for exchanging a setting information of the function of the printer driver between the print server (PS) and the client device (CD). In an embodiment, the non-transitory storage medium, that includes the PD for an MFP that is to be executed by the CD causing the MFP to print via the PS controlling the MFP, restricts the available functions among the functions of the PD to reduce the size of the Devmode to be transmitted to the PS, when the communication speed between the PS and the CD is smaller than or equal to a specified speed.

3 Claims, 10 Drawing Sheets

34b Devmode

| Paper size |
| --- |
| Media type |
| Duplex |
| Watermark |
| Cover page |

FIG.10

44b Devmode

| Paper size |
| --- |
| Media type |
| Duplex |

NON-TRANSITORY STORAGE MEDIUM STORING PRINTER DRIVER TO RESTRICT AVAILABLE FUNCTIONS DEPENDENT UPON COMMUNICATION SPEED WITH SERVER

INCORPORATION BY REFERENCE

This application is based on and claims the benefit of priority from Japanese Patent Application No. 2015-232780 filed on Nov. 30, 2015, the contents of which are hereby incorporated by reference.

BACKGROUND

The present disclosure relates to a non-transitory storage medium and a client server, the non-transitory storage medium storing a printer driver that causes an image forming device to perform a print operation via a print server that controls the image forming device.

A typical technique has been known a print system that includes a print server controlling an image forming device and a client device causing the image forming device, via the print server, to perform a print operation. The client device executes a printer driver for the image forming device and to store setting information of the functions of the printer driver in Devmode. Here, in order to allow the client device to cause the image forming device, via the print server, to perform the print operation, it is necessary for the print server and the client device to store common Devmode data. Thus, sometimes, mutual Devmode data may be synchronized by exchanging the Devmode data between the print server and the client device.

SUMMARY

A non-transitory storage medium of the present disclosure is one that stores a printer driver causing an image forming device to perform a print operation via a print server that controls the image forming device, the printer driver causing a client device to function as: a setting change receipt part that receives a change of setting information of a function of the printer driver; and a setting information transmission part that transmits the setting information to the print server in order to cause the client device to function. The setting change receipt part reduces a size of the setting information to be transmitted to the print server by the setting information transmission part by restricting an available function among functions of the print drive when a communication speed between the print server and the client device is smaller than or equal to a specified speed.

A client device of the present disclosure is one causing an image forming device to perform a print operation via a print server that controls the image forming device, the client device including a storage device that includes a semiconductor memory and a hard disk drive (HDD); and a Central Processing Unit (CPU) that executes the printer driver to function as: a setting change receipt part that receives a change of setting information of a function of the printer driver; and a setting information transmission part that transmits the setting information to the print server. The setting change receipt part reduces a size of the setting information to be transmitted to the print server by the setting information transmission part by restricting an available function among functions of the printer drive when a communication speed between the print server and the client device is smaller than or equal to a specified speed.

BRIEF DESCRIPTION OF THE DRAWINGS

FIG. 10 is an exemplary Devmode that is created by the operation illustrated in FIG. 6.

DETAILED DESCRIPTION

Hereinbelow, with reference to the attached drawings, a description is made as to an exemplary embodiment of the present disclosure.

First of all, a description is made as to a configuration of a print system according to the present exemplary embodiment.

Figure 1:
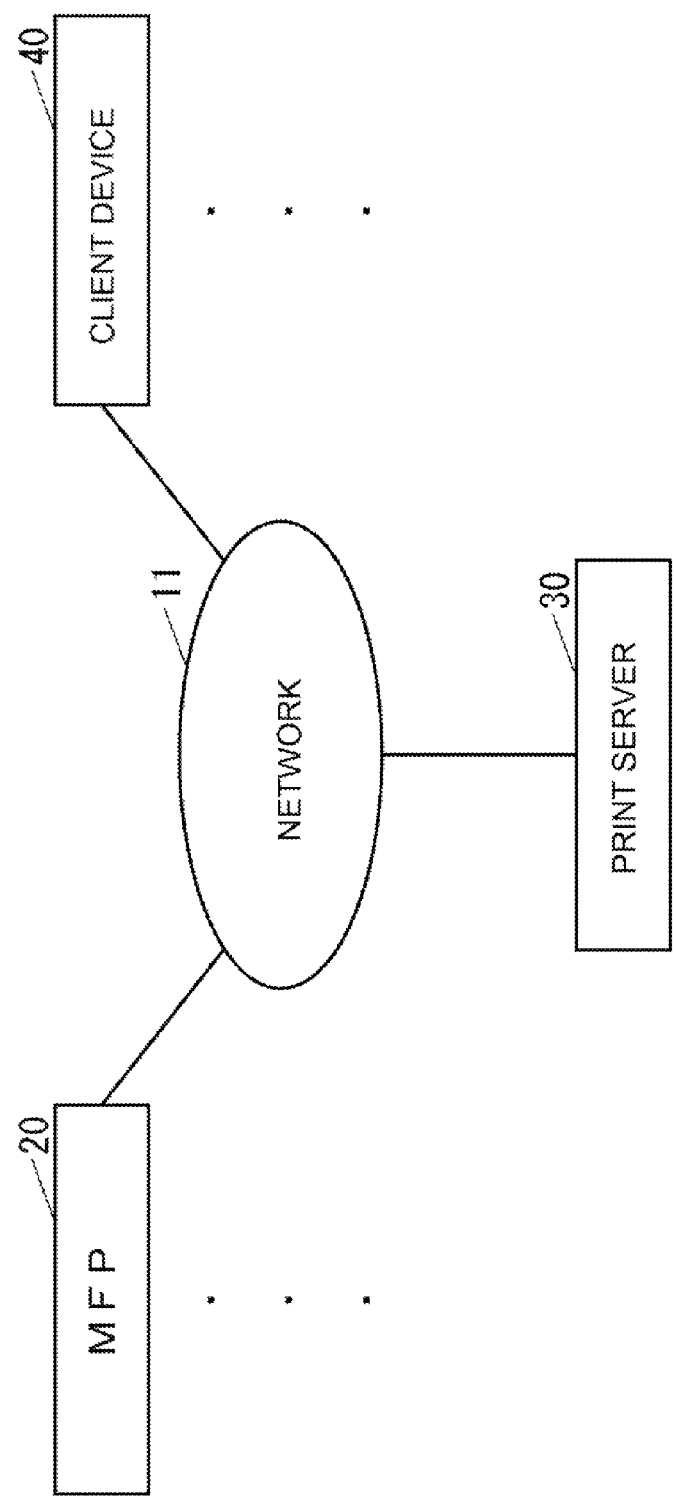
FIG. 1 is a blockdiagram of a configuration of a print system according to an exemplary embodiment of the present disclosure.

FIG. 1 is a blockdiagram of a configuration of a print system 10 according to the exemplary embodiment.

As illustrated in FIG. 1, the print system 10 includes an MFP (Multifunction Peripheral) 20 as an image forming device, a print server 30 that controlling the MFP 20, and a client device 40 causing the MFP 20, via the print server 30, to perform a print operation. The MFP 20, the print server 30, and the client server 40 are to be connected with each other in a communicable manner via a network such as the Internet, LAN (Local Area Network), or the like.

It is to be noted that the print system 10 may be provided, in an additional manner, with at least one MFP whose configuration is identical with the MFP 20.

In addition, the print system 10 may be provided, in an additional manner, with at least one client device whose configuration is identical with the client device 40.

Figure 2:
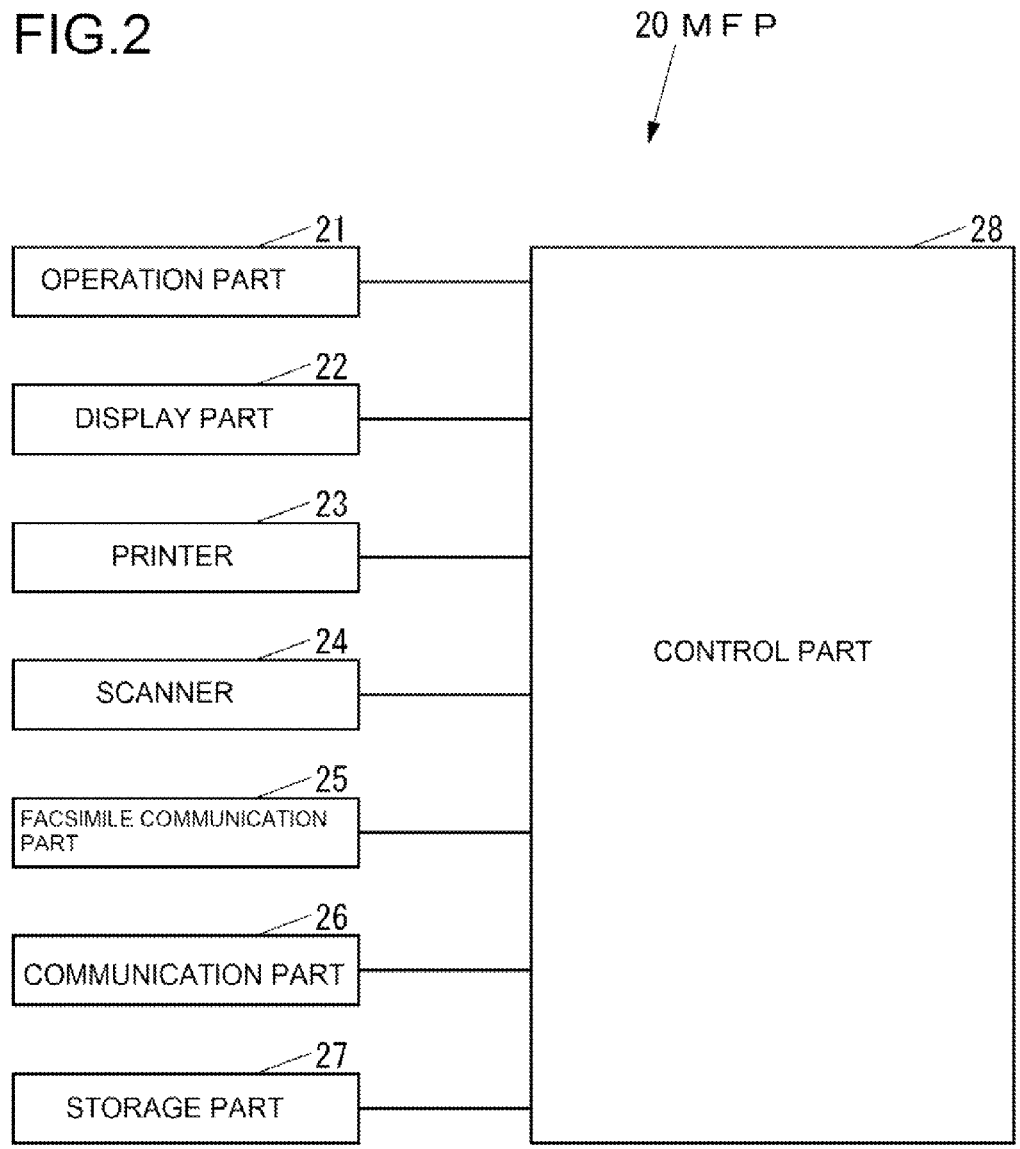
FIG. 2 is a blockdiagram of an MFP illustrated in FIG. 1.

FIG. 2 is a blockdiagram of the MFP 20.

As illustrated in FIG. 2, the MFP 20 includes an operation part 21, a display part 22, a printer 23, a scanner 24, a facsimile communication part 25, a communication part 26, a storage device 27, and a control part 28. An operation part 21 is an operation device including buttons or the like to which various operations are inputted. A display part 22 is a display device that is in the form of, for example, an LCD (Liquid Crystal Display) displaying various information. A printer 23 is a printing device that makes a print on recording media such as paper. A scanner 24 is reading device that reads an image from a manuscript. A facsimile communication part 25 is a facsimile device that performs a facsimile communication with an external facsimile device via a communication channel such as a public telephone line. A communication part 26 is a communication device establishing a communication with an external device via the network 11 (refer to FIG. 1) or in a wired or wireless manner, not via network 11, in a direct manner. A storage device 27 that is in the form of a nonvolatile storage device such as a semiconductor storage device, an HDD (Hard Disk Drive) or the like for storing various data. A control part 28 controls the whole of the MFP 20.

The control part 28 includes, for example, a CPU (Central Processing Unit), a ROM (Read Only Memory) that stores previously programs and various data, and a RAM (Random Access Memory) that acts as a working region for the CPU. The CPU executes the programs stored in the ROM or the storage part 27.

Figure 3:
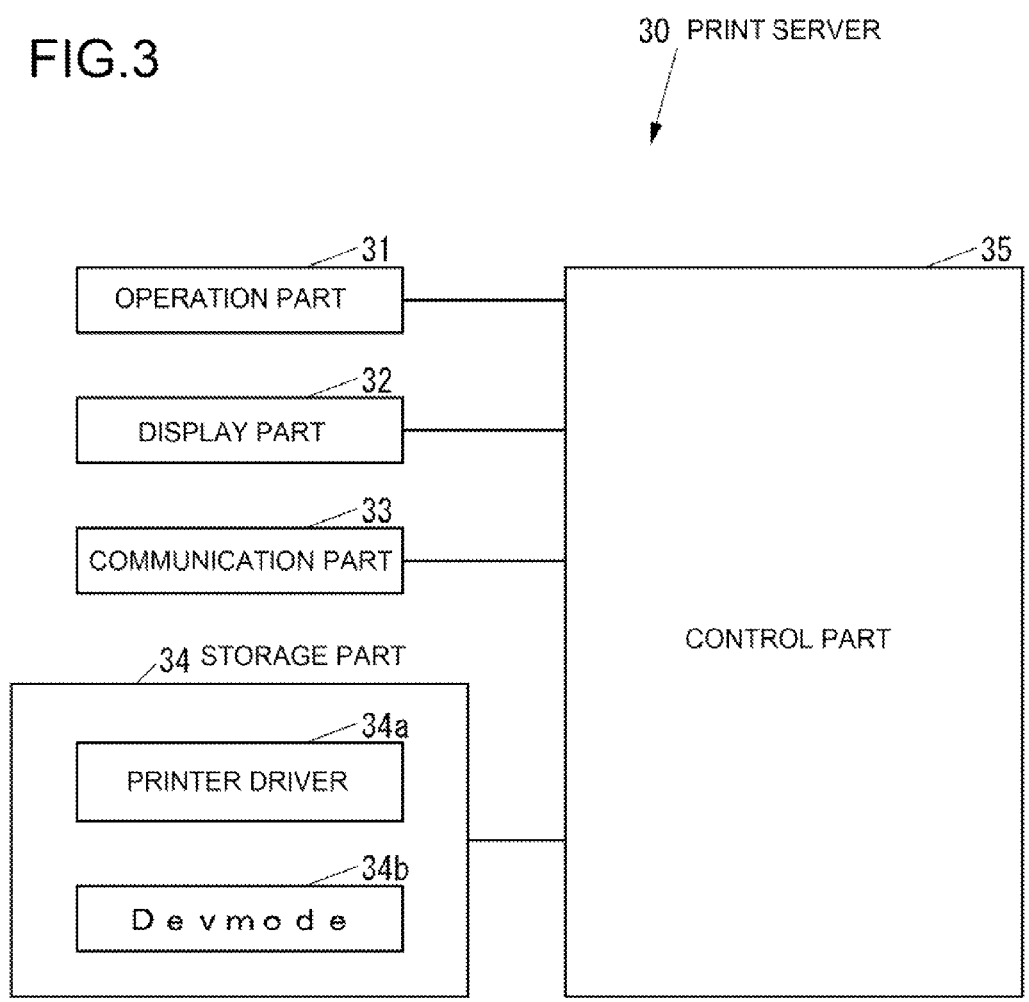
FIG. 3 is a blockdiagram of a print server illustrated in FIG. 1.

FIG. 3 is a blockdiagram of the print server 30.

As illustrated in FIG. 3, the print server 30 includes an operation part 31, a display part 32, a communication part 33, a storage device 34, and a control part 35. An operation part is an operation device including a mouse and a keyboard to which various operations are inputted. A display part 32 is a display device is in the form of, for example, an LCD (Liquid Crystal Display) for displaying various information. A communication part 33 is a communication device establishing a communication with an external device via the network 11 (refer to FIG. 1) or in a wired or wireless manner, not via network 11, in a direct manner. A storage device 34 that is in the form of a nonvolatile storage device such as a semiconductor storage device, an HDD (Hard Disk Drive) or the like storing various data. A control part 35 controls the whole of the print server 30. More specifically, the print server 30 is made up of, for example, a computer such as a PC (Personal Computer) or the like.

The storage part 34 stores a printer driver 34a for the MFP 20. The printer driver 34a may be installed in the print server 30 while it is under production, or may be installed in the print server 30 from an external storage medium such as a CD (Compact Disk) or a DVD (Digital Versatile Disk) in an additional manner or from on the network 11 in an additional manner.

The storage part 34 stores Devmode 34b that contains setting information of the function of the printer driver 34a.

Figure 4:
FIG. 4 is an example of Devmode illustrated in FIG. 3.

FIG. 4 illustrates an example of the Devmode 34b.

The Devmode 34b, that is illustrated in FIG. 4, includes "Paper size" as an item setting a size, such as A4, A3, or the like, of a recording medium to be used in the print operation, "Media type" as an item setting a type, that is indicative of plain paper, recycled paper or the like, of the recording medium to be used in the print operation, "Duplex" as an item setting whether one side or both sides of the recording medium should be printed, "Watermark" as an item setting that prints with a specific watermark when printing on the recording medium, and "Cover page" as an item setting a printing operation on the recording medium to which a specified cover is provided. The Devmode 34b may include one or more other setting items. Although not illustrated, the Devmode 34b includes, together with the setting items, various setting values for each of the setting items.

The control part 35 illustrated in FIG. 3 includes, for example, a CPU (Central Processing Unit), a ROM (Read Only Memory) that stores programs and various data, and a RAM (Random Access Memory) that is known as a working region for the CPU. The CPU executes the programs stored in the ROM or the storage part 34.

Figure 5:
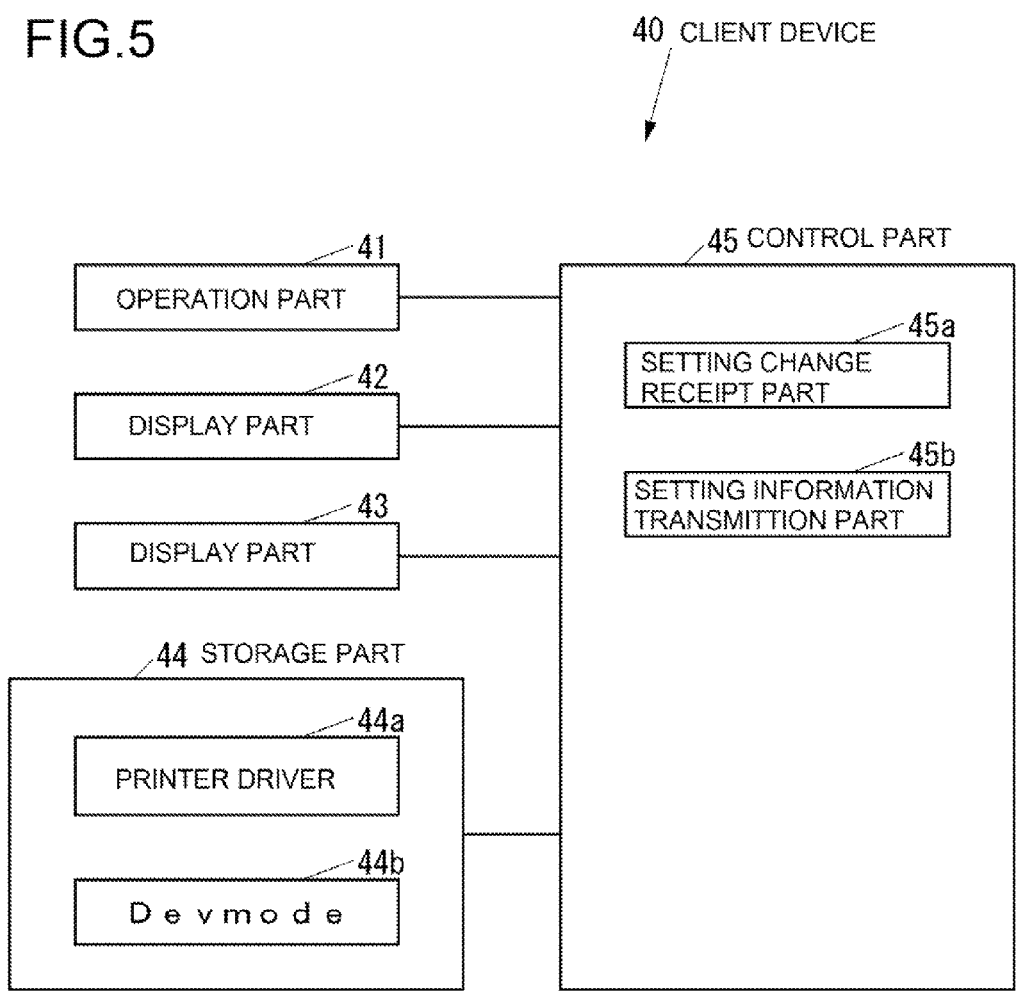
FIG. 5 is a blockdiagram of a client device illustrated in FIG. 1.

FIG. 5 is a blockdiagram of the client device 40.

As illustrated in FIG. 5, the client device 40 includes an operation part 41, a display part 42, a communication part 43, a storage device 44, and a control part 45. An operation part 41 is an operation device including a mouse and a keyboard to which various operations are inputted. A display part 42 is a display device that is in the form of, for example, an LCD (Liquid Crystal Display) displaying various information. A communication part 43 is a communication device communicating with an external device via the network 11 (refer to FIG. 1) or in a wired or wireless manner, not via network 11, in a direct manner. A storage device 44 that is in the form of a nonvolatile storage device such as a semiconductor storage device, an HDD (Hard Disk Drive) or the like for storing various data. A control part 45 controls the whole of the client device 40. More specifically, the client device 40 includes for example, a computer such as a PC or the like.

The storage part 44 stores a printer driver 44a for the MFP 20. The printer driver 44a may be installed in the client device 40 while it is under production, or may be installed in the client device 40 from an external storage medium such as a CD (Compact Disk) or a DVD (Digital Versatile Disk) in an additional manner or from on the network 11 in an additional manner.

The storage part 44 stores a Devmode 44b for retaining setting information of the functions of the printer driver 44a.

The control part 45 includes, for example, a CPU, a ROM storing various data, and a RAM that is known as a working region for the CPU. The CPU executes the programs stored in the ROM or the storage part 44.

The control part 45 so executes the printer driver 44a stored in the storage part 44 as to act as a setting change receipt part 45a receiving a change of the Devmode 44b and a setting information transmission part 45b transmitting the Devmode 44b to the print server 30 (refer to FIG. 3).

Next a description is made as to an operation of the client device 40.

The user is allowed to issue an order, from the operation part 41 via an application that runs on the client device 40 or not via an application, to display a print setting screen for receiving a change of the Devmode 44b of the MFP 20.

Figure 6:
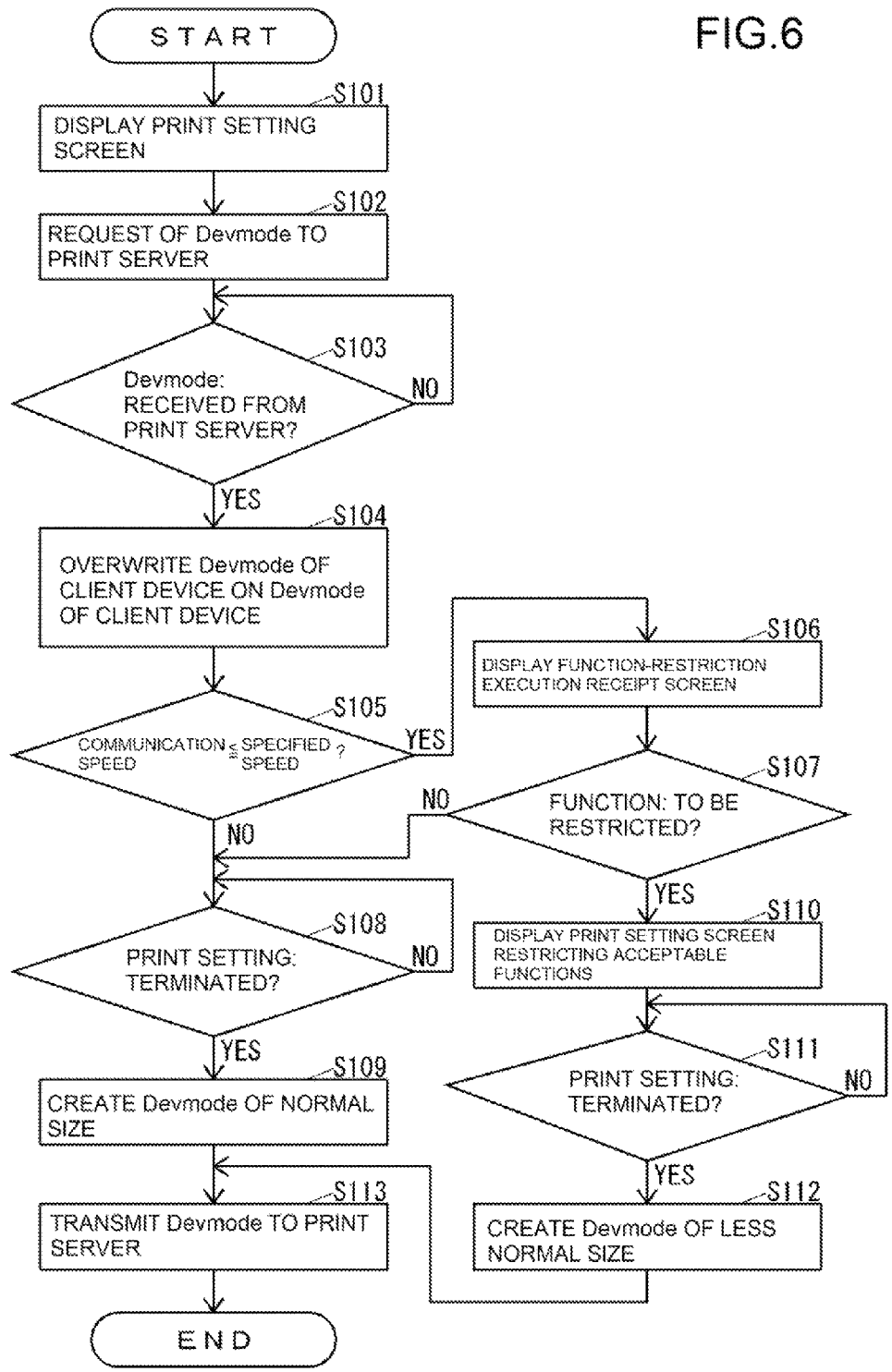
FIG. 6 is a flowchart that is illustrative of how the client device illustrated in FIG. 5 operates upon receipt of a change of the Devmode of the MFP.

When the order to display the print setting screen is issued, the setting change receipt part 45a of the client device 40 executes an operation illustrated by FIG. 6.

FIG. 6 is a flowchart that is illustrative of how the client device 40 operates upon receipt of the change of the Devmode 44b of the MFP 20.

As illustrated in FIG. 6, the setting change receipt part 45a of the client device 40 causes the display part to display the print setting screen 50 (refer to FIG. 7) (S101).

Figure 7:
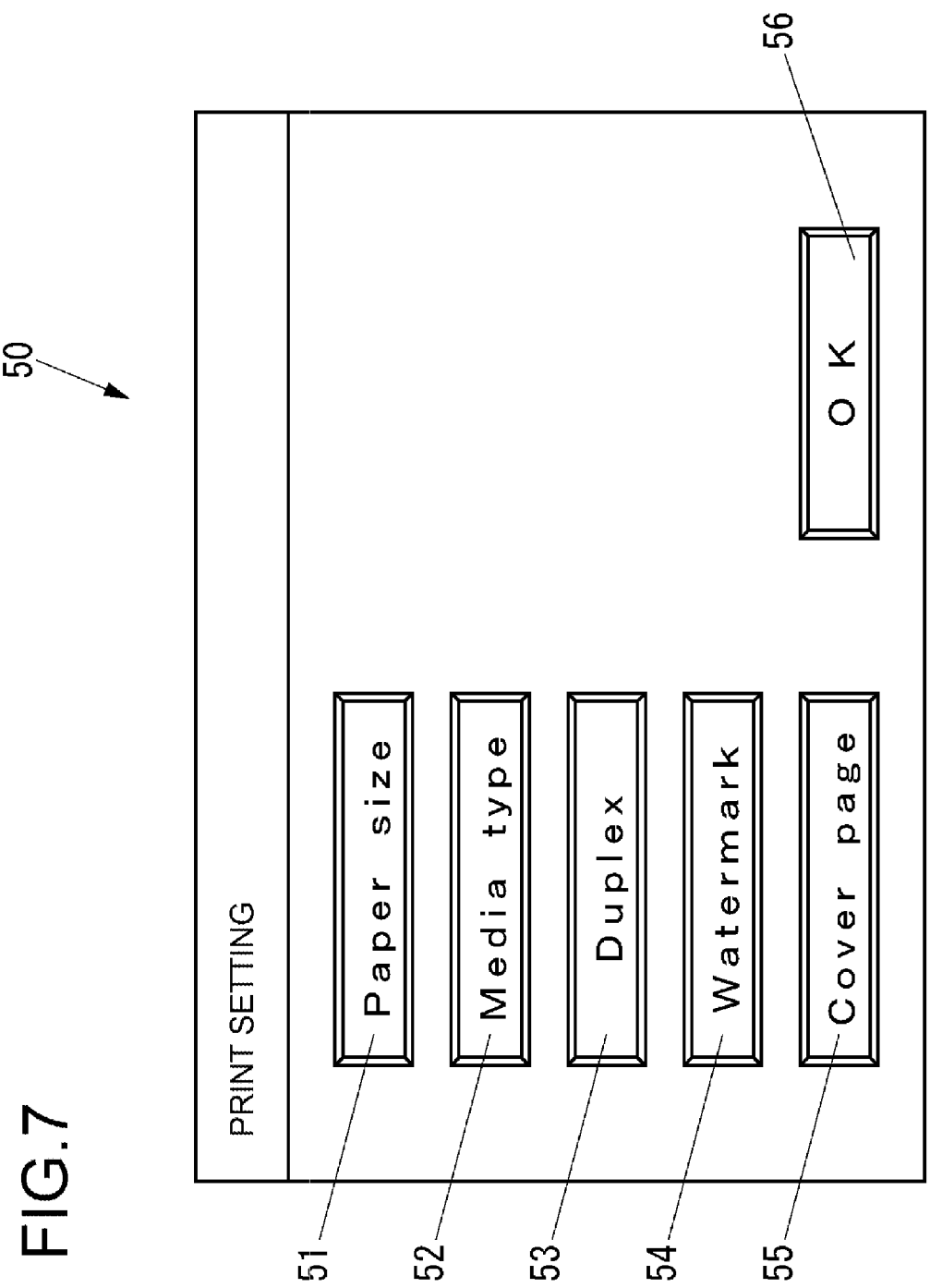
FIG. 7 illustrates an exemplary print setting screen that is displayed during the operation illustrated in FIG. 6.

FIG. 7 illustrates an exemplary print setting screen 50.

The print setting screen 50 illustrated in FIG. 7, includes a button 51 causing the screen to display for changing the setting value of the setting item named "Paper size", a button 52 causing the screen to display for changing the setting value of the setting item named "Media type", a button 53 causing the screen to display for changing the setting value of the setting item named "Duplex", a button 54 causing the screen to display for changing the setting value of the setting item named "Watermark", a button 55 causing the screen to display for changing the setting value of the setting item named "Cover page", and a button 56 causing the print operation setting to terminate.

As illustrated in FIG. 6, after execution of S101, the setting change receipt part 45a makes a request regarding the Devmode 34b stored in the print server 30 to the print server 30 (S102) and continues to determine whether or not the Devmode 34b is received from the print server 30 until a receipt of the Devmode 34b from the print server 30 is determined (S103).

If the setting change receipt part 45a determines, at S103, that the Devmode 34b is received from the print server 30, the setting change receipt part 45a overwrites the received Devmode 34b from the print server 30 on the existing Devmode 44b (S104).

Next, the setting change receipt part 45a determines whether or not a time interval ranging from the request regarding the Devmode 34b to the print server 30 at S102 to the determination of the receipt of the Devmode 34b from the print server 30 at S103 is greater than or equal to a specified value, that is, whether or not the communication speed between the print server 30 and the client device 40 is smaller than or equal to a specified speed (S105).

If the setting change receipt part 45a determines, at S105, that the communication speed between the print server 30 and the client device 40 is smaller than or equal to the specified communication speed, the setting change receipt part 45a causes the display part 42 to display a function-restriction execution receipt screen 60 (refer to FIG. 8) for receiving an execution of a restriction of the function of the printer driver 44a (S106).

Figure 8:
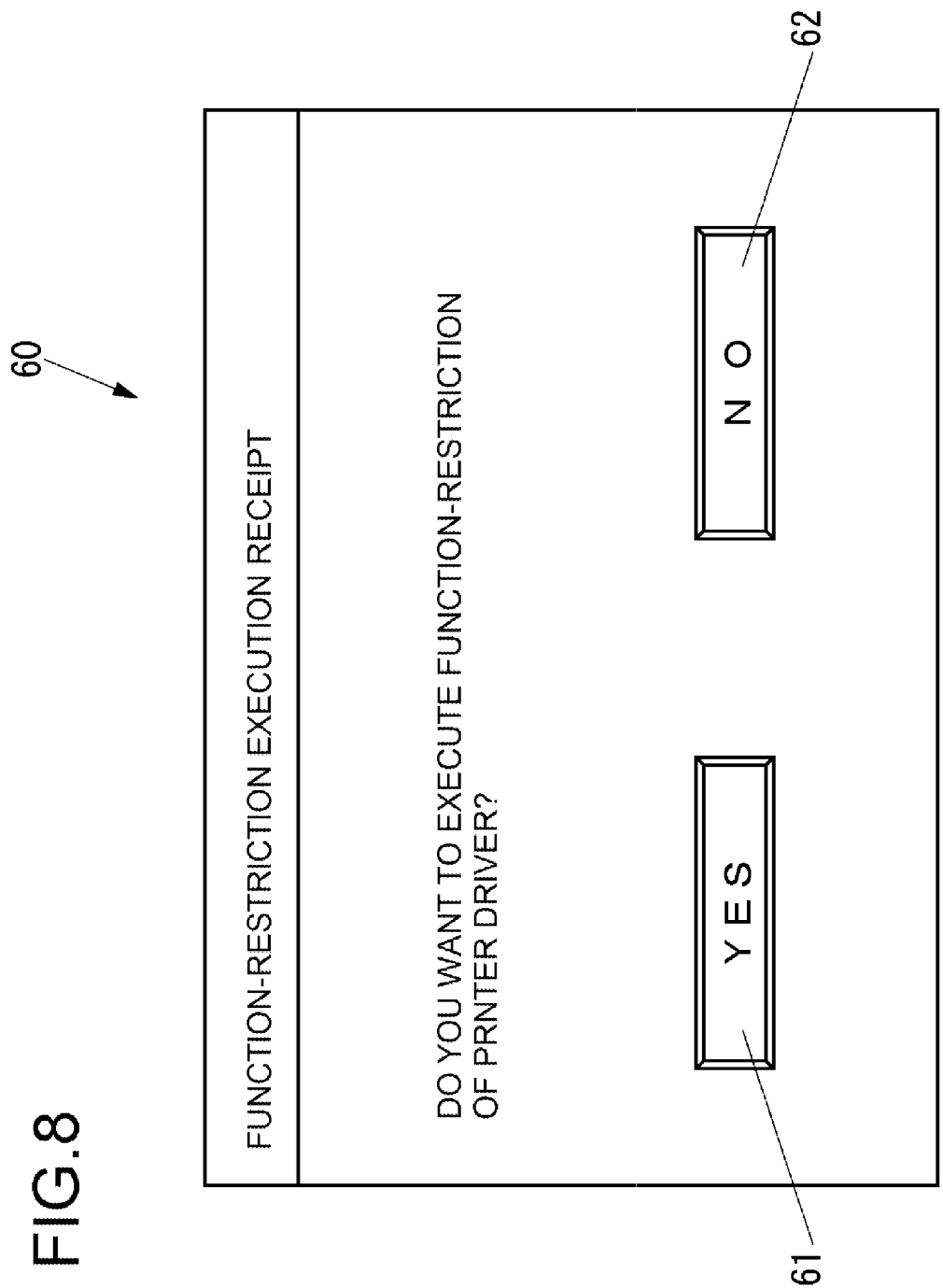
FIG. 8 illustrates an exemplary function-restriction execution receipt screen that is displayed during the operation illustrated in FIG. 6.

FIG. 8 illustrates an example of the function-restriction execution receipt screen 60.

The function-restriction execution receipt screen 60 illustrated in FIG. 8, includes a button 61 executing a restriction of the function of the printer driver 44a and a button 62 for not executing a restriction of the function of the printer driver 44a.

As illustrated in FIG. 6, after execution of S106, the setting change receipt part 45a determines whether or not the restriction of the function of the printer driver 44a should be executed (S107). At this stage, if the button 61 is pushed that appears on the function-restriction execution receipt screen 60, the setting change receipt part 45a determines to execute the restriction of the function of the printer driver 44a. On the other hand, if the button 62 is pushed that appears on the function-restriction execution receipt screen 60, the setting change receipt part 45a determines not to execute the restriction of the function of the printer driver 44a.

If the setting change receipt part 45a determines, at S105, that the communication speed between the print server 30 and the client device 40 is not smaller than or equal to the specified speed, or if the setting change receipt part 45a determines, at S107, not to execute the restriction of the function of the printer driver 44a, the setting receipt part 45a continues to determines whether or not the print setting terminates until the print setting is determined to be terminated (S108). At this stage, if the button 56 is pushed that appears on the print setting screen 50, the setting receipt part 45a determines that the print setting terminates.

If the setting receipt part 45a determines, at S108, that the print setting terminates, the setting receipt part 45a creates, based on the setting in the print setting screen 50, a Devmode 44b for the normal size (S109). For example, the setting receipt part 45a creates the Devmode 44b similar to the Devmode 34b illustrated in FIG. 4.

If the setting change receipt part 45a determines, at S107, to execute the restriction of the function of the printer driver 44a, the setting change receipt part 45a causes the display part 42 to display the print setting screen 50 (refer to FIG. 9) on which the function of the printer driver 44a are restricted to acceptable functions among the function of the printer driver 44a.

Figure 9:
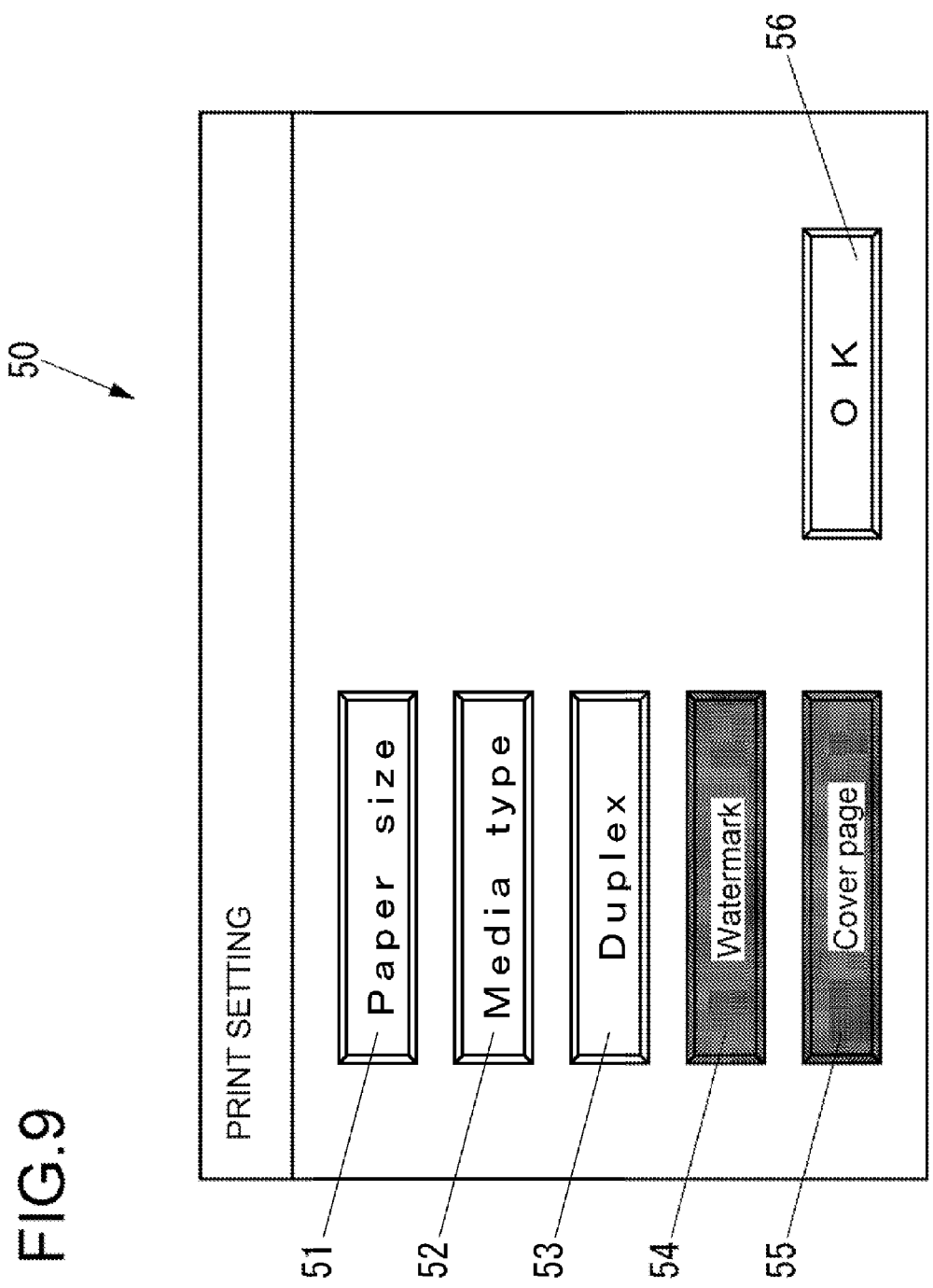
FIG. 9 illustrates an exemplary print setting screen that is displayed, as a different from the example of FIG. 7, during the operation illustrated in FIG. 6.

FIG. 9 illustrates another example of the print setting screen 50 that is different from the example thereof illustrated in FIG. 7.

On the print setting screen 50 illustrated in FIG. 9, the button 54 displaying the screen of changing the setting value of the setting item named "Watermark" and the button 55 that displays the screen of changing the setting value of the setting item named "Cover page" are in a gray out state for the operational disablement. It is to be noted that a button being in the operational disablement depends on the design choice. In addition, for means bringing the button in the operational disablement, other than the graying-out, another means is available such as deleting a button to be disabled in operation.

As illustrated in FIG. 6, after execution of S110, the setting change reception part 45a continues to determine whether or not the print setting terminates until determination of a termination of the print setting (S111). Here, if the button 56 on the print setting screen 50 is pushed, the setting change reception part 45a determines that the print setting terminates.

Figure 10:
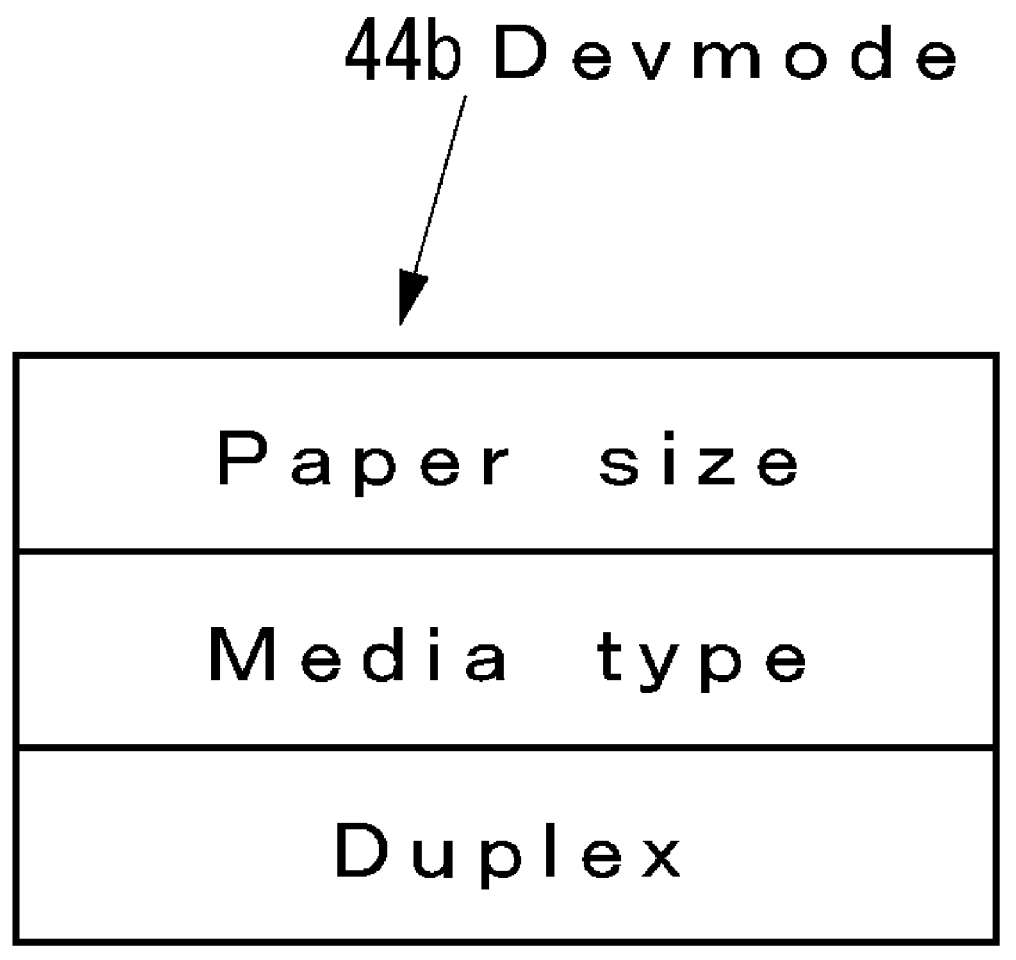

If the setting change reception part 45a determines, at S111, that the print setting terminates, the setting receipt part 45a creates, based on the setting in the print setting screen 50, a Devmode 44b for a size smaller than the normal size (S112). For example, the setting receipt part 45a creates a Devmode 44b illustrated in FIG. 10. Unlike the Devmode 34b illustrated in FIG. 4, the Devmode 44b illustrated in FIG. 10 has nota setting item named "Watermark" and a setting item named "Cover page".

After execution of S109 or S112, the setting information transmission part 45b of the client device 40 transmits the Devmode 44b created in Step 109 or S112 to the print server 30 (S113) and terminates the operation illustrated in FIG. 6.

The control part 35 of the print server 30 that receives the Devmode 44b from the client device 40 overwrites the Devmode 44b received from the client device 40 on the Devmode 34b on the storage part 34.

The user is allowed to issue an instruction to print from the operation part 41 via the application that runs on the client device 40. Upon receipt of the instruction to print from the operation part 41, the control part 45 of the client device 40 activates the printer driver 44a for the creation of print job data and transmits the created print job data to the print server 30. Upon receipt of the print job data from the client device 40, the control part 35 of the printer server 30 activates the printer driver 34a, converts the print job data into PDL (Page Description Language) data, and transmits the converted PDL data to the MFP 20. Upon receipt of the PDL data, the control part 28 of the MFP 20 executes a print operation based the received PDL data and the Devmode 34b on the storage part 34 of the print server 30.

As described above, if the communication speed between the print server 30 and the client device 40 is smaller than or equal to the specified the communication speed (YES at S105), the client device 40 that executes the operation of the printer driver 44a restricts the available functions of the functions of the printer driver 44a (S110), that reduces the size of the Devmode 44b that is the setting information of the function of the printer driver 44a and that is also the setting information to be transmitted to the print server 30 (S112), resulting in suppressing the possible performance degradation of the printer driver due to a time required for exchange of the Devmode 44b between the print server 30 and the client device 40. Thus, the client device 40 that executes the printer driver 44a is capable of improving the user's convenience.

According to this configuration, if the communication speed between the print server and the client device is smaller than or equal to the specified the speed, the printer driver or the client device of the present disclosure restricts the available functions of the functions of the printer driver, that reduces the size of the Devmode that is the setting information of the function of the printer driver and that is also the setting information to be transmitted to the print server, resulting in suppressing the possible performance degradation of the printer driver due to a time required for exchanging the setting information between the print server and the client device.

If the print setting screen 50 is displayed with a high possibility of changing the Devmode 44b (S101), that is, if there is high possibility of a need for exchanging the Devmode 44b between the printer server 30 and the client device 40, the client device 40 that executes the printer driver 44a confirms the communication speed between the print sever 30 and the client device 40 (S105), making it possible to suppress the possible performance degradation of the printer driver in a proper manner that results from a time required for exchange of the Devmode 44b between the print server and the client device.

In the printer driver of the present disclosure, it may be possible for the setting change reception part to confirm the communication speed between the print server and the client device when the print setting screen is displayed that is for receiving a change of the setting information.

According to this configuration, if the print setting screen is displayed with a high possibility of changing the setting screen, that is, if there is a high possibility of a need for exchanging the setting screen between the printer server and the client device, the client device that executes the printer driver of the present disclosure confirms the communication speed between the print server and the client device, making it possible to suppress the possible performance degradation of the printer driver in a proper manner that results from a time required for exchange of the setting information between the print server and the client device.

It is to be noted that the client device 40 may be capable of confirming the communication speed between the print server 30 and the client device 40 if any screen is displayed other than the print setting screen 50.

The client device 40 that executes the printer driver 44a also uses a receiving operation of receiving the Devmode 34b from the print server 30 in order to receive a change of the Devmode 44b (YES at S103) for confirming the communication speed between the print server 30 and the client device 40 (S105), that makes it possible to suppress the performance degradation of the printer driver 44a in a proper manner that results from a time required for exchange of the setting information 44b between the print server 30 and the client device 40.

In the printer driver of the present disclosure, it may be possible for the setting change reception part to confirm the communication speed between the print server and the client device by receiving the setting information stored in the print server when the print setting screen is displayed.

According to this configuration, client device that executes the printer driver of the present disclosure, also uses a receiving operation of receiving the setting information from the print server in order to receive a change of the setting information for confirming the communication speed between the print server and the client device, that makes it possible to restrict the performance degradation of the printer driver efficiently that results from a time required for exchange of the setting information between the print server and the client device.

It is to be noted that the client device 40 may be allowed to receive any data other than the Devmode 34b from the print server 30 in order to confirm the communication speed between the print server 30 and the client device 40.

In the present exemplary embodiment, the client device 40 determines, as to whether or not the restriction of the function of the printer driver 44a should be executed, by the function-restriction execution reception screen 60 during the sequential operation process illustrated in FIG. 6. However, the client device 40 may determine, as to whether or not the restriction of the function of the printer driver 44a should be executed, before the sequential operation process illustrated in FIG. 6. In a case where the client device 40 is set to determine, as to whether or not the restriction of the function of the printer driver 44a should be executed, before the sequential operation process illustrated in FIG. 6, if the client server 40 execute the restriction of the function of the printer driver 44a in the operation illustrated in FIG. 6, the client device 40 may cause the display part 42 to display the execution of the restriction of the function of the printer driver 44a.

In the typical print system, in a case of low communication speed between the print server and the client device due to some reasons that includes, for example, a far distance between the installation site of the print server and the installation site of the client device, there is a problem in that the performance degradation of the printer driver that results from a long time required for exchanging the Devmode between the print server and the client device.

In addition, it is to be noted that: after once exchange of Devmode has been established between the print server and the client device, caching the exchanged Devmode is performed to reduce the number of actual exchange of the Devmode. By the process, there is a method of restricting the performance degradation of the printer driver that results from a time required for exchanging the Devmode between the print server and the client device. However, it is inevitable to avoid performance degradation of the printer driver that results from a time required for exchanging the Devmode between the print server and the client device, if the Devmode is changed in either the print server or the client device or if in the client device the application that the printer drive utilizes makes a request an actual exchange of the Devmode between the print server and the client device.

In view of the aforementioned circumstances, the present disclosure has an object to provide a printer driver and a client device that are capable of suppressing the performance degradation of the printer driver that results from a time required for exchanging the setting information of functions of the printer driver between the print server and the client device.

The printer driver and the client server, according to the present disclosure, make it possible to suppress the performance degradation of the printer driver that results from a time required for exchanging the setting information of functions of the printer driver between the print server and the client device.

The image forming device of the present disclosure is in the form of an MFP in the present exemplary embodiment, however, may be in the form of, for example, a printing dedicated device other than the image forming device embodied in an MFP.

What is claimed is:

1. A non-transitory storage medium that stores a printer driver causing an image forming device to perform a print operation via a print server that controls the image forming device, the printer driver causing a client device to function as:

a setting change receipt part that receives a change of setting information of a function of the printer driver; and
   a setting information transmission part that transmits the setting information to the print server in order to cause the client device to function,
   wherein the setting change receipt part reduces a size of the setting information to be transmitted to the print server by the setting information transmission part by restricting an available function among functions of the printer driver when a communication speed between the print server and the client device is smaller than or equal to a specified speed.

2. The non-transitory storage medium according to claim 1, wherein the setting change receipt part makes a check of the communication speed between the print server and the client device when a print setting screen is displayed that is for receiving a change of the setting information.

3. The non-transitory storage medium according to claim 2, wherein the setting change receipt part makes a check of the communication speed between the print server and the client device by receiving the setting information stored in the print server when a print setting screen is displayed.

\* \* \* \* \*